No. 659,815. Patented Oct. 16, 1900.
F. W. HUESTIS.
METHOD OF MAKING NON-SLIPPING TREADS, PAVING, &c.
(Application filed Mar. 28, 1900.)
(No Model.)

WITNESSES.
C. H. Gannett
W. W. Drummond

INVENTOR.
Frederick William Huestis
by his attorney
Edward J. Beach

United States Patent Office.

FREDERICK WILLIAM HUESTIS, OF NEWTON, MASSACHUSETTS, ASSIGNOR TO THE UNIVERSAL SAFETY TREAD COMPANY, OF JERSEY CITY, NEW JERSEY.

METHOD OF MAKING NON-SLIPPING TREADS, PAVING, &c.

SPECIFICATION forming part of Letters Patent No. 659,815, dated October 16, 1900.

Application filed March 28, 1900. Serial No. 10,461. (No model.)

*To all whom it may concern:*

Be it known that I, FREDERICK WILLIAM HUESTIS, a citizen of the United States, residing at Newton, in the county of Middlesex and State of Massachusetts, have invented certain new and useful Improvements in Methods of Making Non-Slipping Treads, Paving, &c., of which the following is a specification, reference being had therein to the accompanying drawings.

Figure 1:
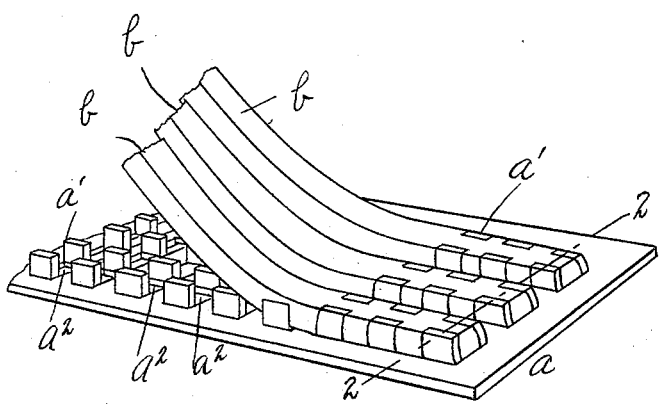
Figure 2:

Reference being had to the accompanying drawings, Figure 1 is a perspective view showing a plurality of strips of pliable material (lead, for example) united at end portions with one form of base-plate, the other portions of the strips being in position to illustrate their assemblage in parallelism. Fig. 2 is a sectional view illustrating the completed article of manufacture and is taken at line 2 2 of Fig. 1.

The object of my invention is to produce an economical and practically-effective method of uniting the so-called "non-slipping" material and hard-metal base-plates of so-called "non-slipping" treads, pavements, and the like.

In accordance with my present invention I first assemble a plurality of strips of the non-slipping material, preferably lead, in parallelism with each other at distances apart and in line with spaces between the projecting wear or tread surfaces of the base-plate, the strips being of a shape which requires alteration in order that the strips may fit and fill the said spaces. I next transform said strips under a homing pressure into shapes that fit and fill said spaces, and during such transformation and pressure I bend inwardly upon each strip the upturned wear-surfaces, which may be either interrupted, as in United States Letters Patent No. 638,666, of December 5, 1899, or continuous, as in United States Letters Patent No. 481,702, of August 30, 1882, for examples.

My new method may be practiced by a great variety of either hand or power driven apparatus or machinery, and in my application, Serial No. 10,462, of even date, I describe forms of power-driven machines suitable for the purpose.

In the accompanying drawings, $a$ is the base-plate, and $a'$ its upwardly-turned tread-surfaces or wear-points, which are formed in parallel rows. The plate $a$ is preferably perforated at $a^2$ along every other space or lane $a^3$ between the tread-surfaces, and the strips $b$, of lead or other suitable non-slipping material, are combined with the plate by anchoring them between rows of tread-surfaces, preferably, but not necessarily, leaving every other lane vacant. The strips $b$, being arranged in parallelism and in line with the lanes to be filled, are forced simultaneously under my new method into the lanes, each strip being of a shape which requires expansion in order to make it fit and fill the lane in which it is mounted. The homing pressure on the strips when the plate has perforations, as in the form shown, not only transforms the strips in shape, so as to make them fit and fill the lanes, but also forces the lead through the porferations, so it becomes anchored on the back or under side of the plate. The pressure which transforms the lead strips and forces each strip home is utilized, in accordance with my invention, to cant the wear-surfaces inwardly, as shown in Fig. 2, upon the strips.

What I claim is—

1. The herein-described improvement in the art of making non-slipping treads, paving and the like, said improvement consisting in the method of first assembling a plurality of pliable strips in parallelism and in line with spaces between rows of tread-surfaces which project from a base-plate; and secondly, in simultaneously transforming and homing the strips in said spaces and canting the opposing wear-surfaces upon intermediate strips.

2. The herein-described improvement in the art of making non-slipping treads, paving and the like, said improvement consisting in the method of first assembling a plurality of pliable strips in parallelism and in line with spaces between rows of tread-surfaces which project from a base-plate; and, secondly, in simultaneously transforming and homing the strips in said spaces.

In testimony whereof I affix my signature in presence of two witnesses.

FREDERICK WILLIAM HUESTIS.

Witnesses:
EDWARD S. BEACH,
E. A. ALLEN.